United States Patent

[11] 3,620,322

| [72] | Inventor | Clifford Dean Peterson<br>704 W. Olive, Marshalltown, Iowa 50158 |
| [21] | Appl. No. | 851,572 |
| [22] | Filed | Aug. 20, 1969 |
| [45] | Patented | Nov. 16, 1971 |

[54] UNIVERSAL DRIVE APPARATUS
4 Claims, 3 Drawing Figs.

[52] U.S. Cl. .................................................... 180/51, 64/7
[51] Int. Cl. ...................................................... B60k 17/30
[50] Field of Search ........................................... 64/17, 18, 7; 180/44, 51, 79.2 B

[56] References Cited
UNITED STATES PATENTS

| 3,291,244 | 12/1966 | Garrett | 180/51 |
| 3,434,739 | 3/1969 | Schoonover | 180/79.2 B |
| 1,440,648 | 1/1923 | Thiemer | 64/7 |
| 1,853,171 | 4/1932 | Nettenstrom | 64/17 |

Primary Examiner—Mark M. Newman
Assistant Examiner—Randall Hedd
Attorney—Henderson & Strom ABSTRACT: A universal drive apparatus to connect the frames and the power-transmitting shafts of two sets of driven wheels to make a four wheel drive articulating frame vehicle.

PATENTED NOV 16 1971

3,620,322

INVENTOR
CLIFFORD DEAN PETERSON
BY
Henderson & Strom
ATTORNEYS

UNIVERSAL DRIVE APPARATUS

BACKGROUND OF THE INVENTION

1. Field of Invention

This invention relates to an improved universal drive apparatus used on a four-wheel-drive-articulating frame vehicle and more particularly, to an improved and novel arrangement of parts.

2. Description of the Prior Art

In the past the universal drive mechanism for an articulating frame vehicle has consisted of several parts and tended to be complicated. The apparatus used to achieve the vertical swing action and the horizontal rotating motion consisted of many parts and required several fasteners.

Some required more than one universal drive joint and a means to take up misalignment.

SUMMARY OF THE INVENTION

An important object of the present invention is to provide an improved universal drive and frame section, having only a few basic parts, to achieve the vertical swing action and the horizontal rotating motion. Both the vertical swing action and the horizontal rotating motion pivot about the same moment; which is the center point of the universal joint.

A further object of the present invention is to provide a universal drive apparatus having three basic parts in the frame section, which can be assembled without tools or fasteners. To assemble this portion, (1) install bearing plates in the clevis member of the frame. (2) Insert the tube section of the frame lengthwise into the clevis member with the tube opening facing one bearing plate. (3) With the tube section inserted so that the tube section is centered and engages in the bearing plates, rotate tube section 90° so that the tube opening now faces the bearing support.

A further object of the present invention is to provide a universal drive apparatus having only one universal drive joint to transmit power.

Further advantages of this invention will become apparent as the following description proceeds, and the features of novelty will be pointed out and claimed.

DESCRIPTION OF THE PREFERRED EMBODIMENTS

Figure 1:
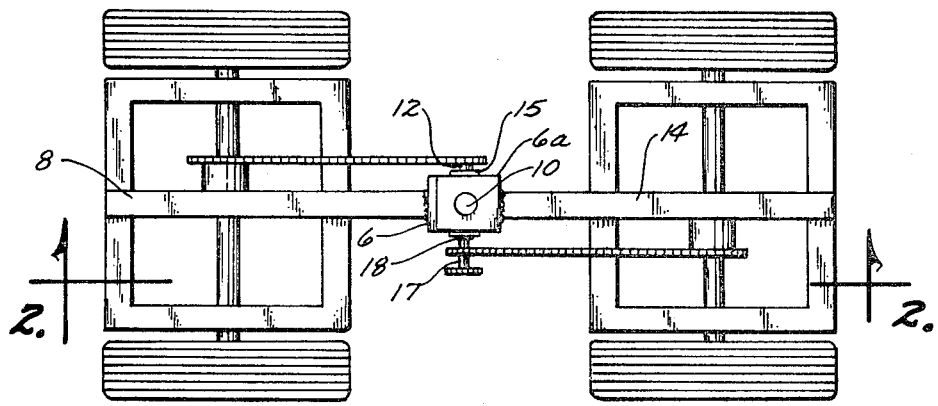
FIG. 1 is a top view showing a chassis of a vehicle embodying the universal apparatus of this invention.
Figure 2:
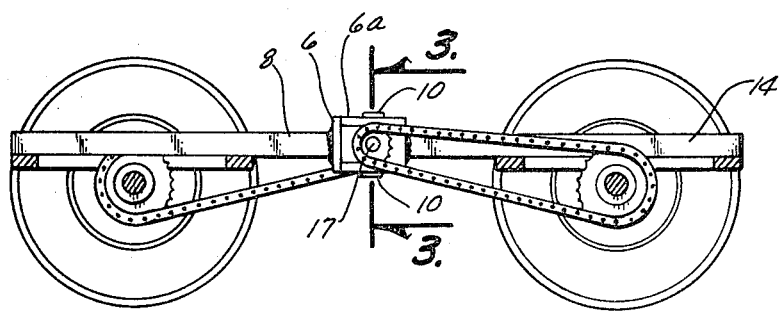
FIG. 2 is a sectional view taken along line 2—2 of FIG. 1.

The frame portion of the apparatus consists of three basic parts, the clevis 6, bearing plates 9a –9b and tube 11. The clevis-shaped member 6, FIG. 4, having a front portion 6 and 2 parallel disposed arms 6a –6b that captivates the remaining parts of the apparatus. Each arm 6a –6b, has a hole 7, in it. The front portion 6, is connected to one half of the chassis 8 by suitable means. Bearing plates 9a–9b, FIG. 3 have a fixed stub shaft 10 that engages in hole 7 of arms 6a –6b. There are two bearing plates, 9a on top and 9b on the bottom. The bearing plates 9a –9b are held in place vertically by the tube 11. The tube has a section removed from one side to allow movement in all directions of a rotatable shaft 12. The tube 11 has the same outside diameter as the inside diameter of the bearing plates 9a –9b. This allows the tube to rotate about a horizontal axis inside the bearing plates. The tube 11 has end caps affixed to each end. The end caps have the same outside diameter as the bearing plates 9a –9b, and so captivate the bearing plates, 9a –9b, because the plates 9a –9b, and the tube, 11, are the same length. One end cap is connected to the other half of the chassis 14, by suitable means.

Figure 3:
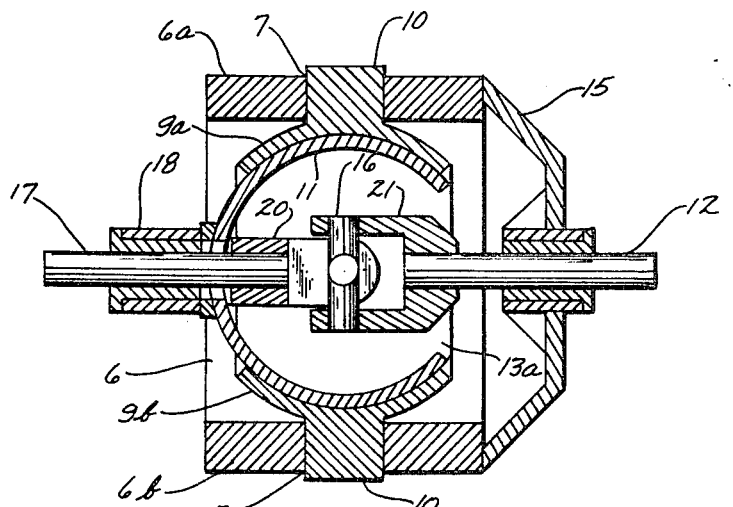
FIG. 3 is an enlarged section view taken along line 3—3 of FIG. 2.

The arms, 6a –6b, have a support means 15, FIG. 3 in which a rotatable shaft 12 is journaled. The shaft 12 is connected to a rotatable universal drive joint 16 by suitable means. A second rotatable shaft 17 is also connected to the universal joint by suitable means. The shaft 17 is journaled in a support means 18 that is fastened to the tube 11 by standard fasteners. This support means 18 creates a stop so that the tube cannot rotate far enough to become disengaged from the bearing plates, 9a –9b, during normal operation. The shaft 17, bearing assembly 18, tube 11 and half of the universal joint 20 all rotate about the same horizontal axis in relation to the frame member 6, support 15, bearing plates 9a –9b, shaft 12 and the other half of the universal joint 21.

The frame member 8, support 15, shaft 12 and half of the universal joint 21 all pivot about the same vertical axis in relation to the bearing plates 9a –9b, tube 11, support 18, shaft 17 and half of the universal joint 20. This swing action is approximately 45° in both directions.

For illustration I have shown the invention applied to a four-wheel-drive-articulating frame vehicle. The power required to drive the vehicle can be supplied by any internal or external combustion engine or by an electric motor through any one of several suitable transmissions. The engine and/or operator's controls can be mounted on either end of the vehicle. The invention pertains to the universal joint apparatus and it is my intention that no limitations be implied.

What I claim as new and desire to secure by Letters Patent of the United States is:

1. An articulated vehicle including:
   a first frame section carrying an axle;
   a second frame section carrying a second axle;
   a clevis member including two parallel disposed arms rigidly affixed to the first frame section;
   bearing plates rotatably mounted to said arms facing inwardly and adapted to receive a tube, said tube being rigidly secured to said second frame section and shaped to conform to the inner surface of said bearing plates for rotation therein;
   end cap means attached to said tube, the end cap means being adapted to hold the tube against longitudinal removal upon partial rotation of said tube within said bearing plates;
   means adapted to limit the rotation of said tube within said bearing plates after insertion therein to prevent removal of said tube from said bearing plates;
   said first and second frame sections thereby being adapted to pivot about a vertical axis through their connecting point and to rotate a limited amount with respect to each other about a longitudinal axis while being supported by said clevis member, and a universal-joint-driving means connecting said axles together and located within said tube.

2. An articulated vehicle as defined in claim 1 wherein said vehicle has drive means powering wheels carried by each of said axles.

3. An articulated vehicle as defined in claim 2 wherein said end means includes caps secured over the ends of said tube preventing longitudinal movement of said tube with respect to said bearing plates after the tube has been inserted and rotated into a held position within said tube.

4. An articulated vehicle as defined in claim 3 wherein: said vehicle is a four-wheel-drive vehicle;
   wherein said tube has a support for said driving means which includes a power transmitting shaft, said shaft extending into said tube;
   said tube has an opening opposite said support and a second power transmitting shaft extending therethrough;
   both of said shafts being connected by the universal joint within said tube.

\* \* \* \* \*